(12) United States Patent
McKinney

(10) Patent No.: US 8,091,040 B2
(45) Date of Patent: *Jan. 3, 2012

(54) METHOD AND SYSTEM FOR DISPLAYING A PLURALITY OF DISCRETE FILES IN A COMPOUND FILE

(75) Inventor: Robert S. McKinney, Santa Clara, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/634,495

(22) Filed: Dec. 9, 2009

(65) Prior Publication Data
US 2010/0153874 A1    Jun. 17, 2010

Related U.S. Application Data

(62) Division of application No. 09/364,595, filed on Jul. 30, 1999, now Pat. No. 7,644,366.

(51) Int. Cl.
*G06F 3/048* (2006.01)

(52) U.S. Cl. ........ 715/790; 715/777; 715/783; 715/793; 715/797; 715/804

(58) Field of Classification Search .................. 715/777, 715/790–797, 783, 804
See application file for complete search history.

(56) References Cited

U.S. PATENT DOCUMENTS

| | | | |
|---|---|---|---|
| 5,257,185 A | 10/1993 | Farley et al. | 707/100 |
| 5,359,724 A | 10/1994 | Earle | 395/425 |
| 5,379,419 A | 1/1995 | Hefferman et al. | 395/600 |
| 5,410,693 A | 4/1995 | Yu et al. | 395/600 |
| 5,481,700 A | 1/1996 | Thuraisingham | 395/600 |
| 5,523,942 A | 6/1996 | Tyler et al. | 705/4 |
| 5,548,769 A | 8/1996 | Baum et al. | 395/800 |
| 5,555,403 A | 9/1996 | Cambot et al. | 707/4 |
| 5,588,109 A | 12/1996 | Dickinson et al. | 345/740 |
| 5,671,379 A | 9/1997 | Kuse et al. | 345/804 |
| 5,701,453 A | 12/1997 | Maloney et al. | 395/602 |
| 5,721,903 A | 2/1998 | Anand et al. | 395/605 |
| 5,734,380 A | 3/1998 | Adams et al. | 345/804 |
| 5,760,770 A | 6/1998 | Bliss et al. | 345/745 |
| 5,761,684 A | 6/1998 | Gibson | 715/515 |
| 5,801,701 A | 9/1998 | Koppolu et al. | 345/352 |

(Continued)

FOREIGN PATENT DOCUMENTS

EP        0 450 825 A2    3/1991

(Continued)

OTHER PUBLICATIONS

"Previous Button and Tab-extensions for Accessing Windows", IBM technical Disclosure Bulletin, Sep. 1, 1994, vol. 37, pp. 471-474; TDB-ACC-No. NN9409471.*

(Continued)

*Primary Examiner* — Ba Huynh
(74) *Attorney, Agent, or Firm* — Pillsbury Winthrop Shaw Pittman LLP

(57) ABSTRACT

A method for managing and displaying related information in a graphical user interface includes storing each of a plurality of related datasets in a discrete file. A compound file is stored linking the discrete data files to each other. A common window for the combined file is displayed in the graphical user interface. A discrete window for each discrete file is displayed within the common window.

12 Claims, 9 Drawing Sheets

U.S. PATENT DOCUMENTS

| | | | |
|---|---|---|---|
| 5,802,511 A | 9/1998 | Kouchi et al. | 707/2 |
| 5,812,394 A | 9/1998 | Lewis et al. | 700/17 |
| 5,831,617 A | 11/1998 | Bhukhanwala | 345/349 |
| 5,842,199 A | 11/1998 | Miller et al. | 707/2 |
| 5,852,818 A | 12/1998 | Guay et al. | 707/1 |
| 5,864,857 A | 1/1999 | Ohata et al. | 707/100 |
| 5,870,746 A | 2/1999 | Knutson et al. | 707/101 |
| 5,870,756 A | 2/1999 | Nakata et al. | 707/200 |
| 5,917,483 A | 6/1999 | Duncan et al. | 345/333 |
| 5,918,232 A | 6/1999 | Pouschine et al. | 707/103 R |
| 5,920,316 A | 7/1999 | Oran et al. | 345/348 |
| 5,943,677 A | 8/1999 | Hicks | 707/205 |
| 5,978,796 A | 11/1999 | Malloy et al. | 707/3 |
| 6,026,399 A | 2/2000 | Kohavi et al. | 707/6 |
| 6,047,280 A | 4/2000 | Ashby et al. | 707/2 |
| 6,094,684 A | 7/2000 | Pallmann | 709/227 |
| 6,112,024 A | 8/2000 | Almond et al. | 717/122 |
| 6,122,628 A | 9/2000 | Castelli et al. | 707/5 |
| 6,134,541 A | 10/2000 | Castelli et al. | 707/2 |
| 6,141,007 A | 10/2000 | Lebling et al. | 345/792 |
| 6,151,601 A | 11/2000 | Papierniak et al. | 707/10 |
| 6,152,601 A | 11/2000 | Papierniak et al. | 707/10 |
| 6,160,549 A | 12/2000 | Touma et al. | 345/333 |
| 6,198,487 B1 | 3/2001 | Fortenbery et al. | 345/420 |
| 6,205,447 B1 | 3/2001 | Malloy | 707/102 |
| 6,282,547 B1 | 8/2001 | Hirsch | 707/102 |
| 6,285,369 B1 | 9/2001 | Kross et al. | 345/419 |
| 6,327,574 B1 | 12/2001 | Kramer et al. | 705/14 |
| 6,374,252 B1 | 4/2002 | Althoff et al. | 707/102 |
| 6,442,566 B1 | 8/2002 | Atman et al. | 707/103 R |
| 6,466,941 B1 | 10/2002 | Rowe et al. | 707/102 |
| 6,505,246 B1 | 1/2003 | Land et al. | 709/224 |
| 6,587,836 B1 | 7/2003 | Ahlberg et al. | 705/26 |
| 6,618,754 B1 | 9/2003 | Gosling | 709/220 |
| 6,901,433 B2 | 5/2005 | San Andres et al. | 709/216 |
| 7,107,226 B1 | 9/2006 | Cassidy et al. | 705/26 |
| 7,149,698 B2 | 12/2006 | Guheen et al. | 705/1 |
| 7,167,550 B2 | 1/2007 | Klos et al. | 379/201.01 |
| 7,356,569 B1 | 4/2008 | Kembel et al. | 709/217 |
| 7,644,366 B1 | 1/2010 | McKinney | 715/738 |
| 2001/0049694 A1 | 12/2001 | Daudenarde | 707/200 |
| 2001/0051949 A1 | 12/2001 | Carey et al. | 707/103 R |
| 2002/0038308 A1 | 3/2002 | Cappi | 707/104.1 |
| 2005/0065845 A1 | 3/2005 | DeAngelis | 705/14 |

FOREIGN PATENT DOCUMENTS

| | | |
|---|---|---|
| EP | 0 490 465 A2 | 7/1991 |
| WO | WO 92/08199 | 5/1992 |
| WO | WO 99/40510 | 8/1999 |

OTHER PUBLICATIONS

Molap vs. Rolap; www.forwise.tu-muenchen.de, printed Nov. 16, 2000.

White, Colin, "Using Information Portals in the Enterprise", *DM Review*, Apr. 1999.

Business Objects: home page; "Scalable Solutions for e-Business Intelligence"; "BusinessObjects 2000 and the Enterprise"; "Product Line Overview—A World of e-Business Intelligence Solutions"; "BusinessObjects—Query, Reporting, and OLAP for Business Users"; "BusinessObjects Infoview—Your Portal for Collaboration and Distribution of e-Business Intelligence"; "WebIntelligence—Integrated Query, Reporting, and Analysis for the Web"; "Essbase® OLAP Access Pack"; "Introducing BusinessMiner—Business Mining for Decision Support Insights"; www.businessobjects.com, Printed Nov. 16, 2000.

Hyperion: home page; "Welcome to Hyperion"; "Products & Solutions"; "Hyperion Solutions"; "Hyperion Essbase Technologies"; "White Papers"; "What is OLAP?";www.hyperion.com, printed Oct. 13, 2000.

The OLAP Report: home page.; "About the OLAP Report"; "Product Reviews"; "Market and Product Analysis"; "MIS 696G, Knowledge Transfer Paper, On-Line Analytical Processing"; www.olapreport.com, printed Oct. 13, 2000.

DSSResources.COM-Decision Support Systems Resources Home page: DSS News; "DSS Articles On-Line"; "A Brief History of Decision Support Systems"; www.dssresources.com, printed Nov. 16, 2000.

Decision Frontier Solution Suite for Business-Critical Data Marts: Red Brick: home page; "Informix Decision Frontier Solution Suite for Business-Critical Data Marts"; "Decision Frontier Solution Suite for Business—Critical Data Marts"; "Informix Red Brick Warehouse"; www.redbrick.com, printed Oct. 13, 2000.

Brio Technology: home page; "Brio ONE"; "Brio.Enterprise 6.0™"; "Brio.Portal 6.0"; "Brio.Report 6.O™"; "The Brio.Impact Revenue Optimization Application"; "Secure Business Intelligence with Brio Enterprise"; "Documentation of BrioQuery 6.0 Terms"; "Enterprise Business Intelligence from Brio Technology"; www.brio.com, printed Oct. 13, 2000.

Mark Whitehorn et al., "DB2 for Windows NT®—FAST", Springer-Verlag London Limited, 1998.

"Microsoft Access 97 Sept by Step", Microsoft Press, 1997.

White, Colin, "Using Information Portals in the Enterprise", *DM Review*, Apr. 1999.

Dhar, Vasant, et al., "Seven Methods for Transforming Corporate Data into Business Intelligence", Prentice Hall, 1997.

Bell et al., "A Flexible Parallel Database System Using Transputers", *Proceedings of the Annual European Conference on Computer Systems and Software Engineering (COMPEURO)*, May 4-8, 1992, 7 pages.

PCT International Search Report in International Application No. PCT/US00/20691, dated Nov. 26, 2001, 6 pages.

PCT International Search Report in International Application No. PCT/US00/20708, dated Dec. 6, 2001, 7 pages.

PCT International Search Report in International Application No. PCT/US00/20692, dated Dec. 18, 2001, 7 pages.

PCT International Search Report in International Application No. PCT/US00/20693, dated Dec. 27, 2001, 9 pages.

Powers, Jr. et al., "User-Friendly Software System for Analyzing Antennas and Radiowave Propagation Links", *Conference Record of MILCOM '92—Military Communications Conference 1992*, Oct. 11-14, 1992, 4 pages.

Schmid et al., "Comparative Multivariable Visualization Across Conceptually Different Graphic Displays", *Proceedings of the Seventh International Working Conference on Scientific and Statistical Database Management 1994*, Sep. 28-30, 1994, 10 pages.

"Scrolling Tab Feature for a Notebook Control" *IBM Technical Disclosure Bulletin*, vol. 39, No.7, Jul. 1996, 2 pages.

"Window Pull-Out", *IBM Technical Disclosure Bulletin*, vol. 38, No. 8, Aug. 1995, 1 page.

Lehner et al., "Cross-DB: A Feature-Extended Multidimensional Data Model for Statistical and Scientific Databases", *ACM Digital Library*, Aug. 1996, pp. 253-260.

English translation of the First Office Action for Chinese Patent Application No. 00812612.7, Oct. 10, 2003, 2 pages.

\* cited by examiner

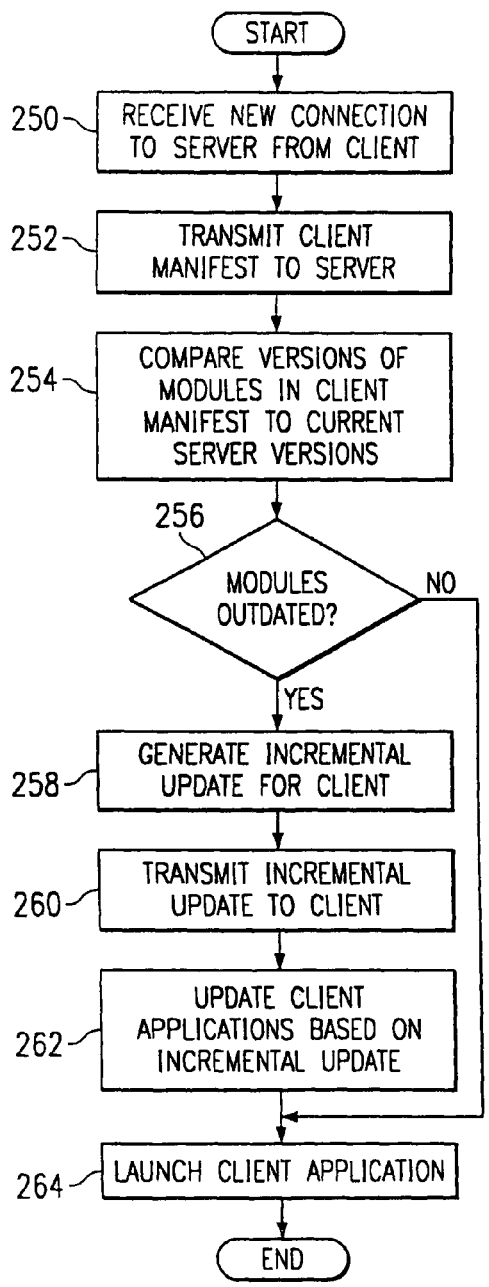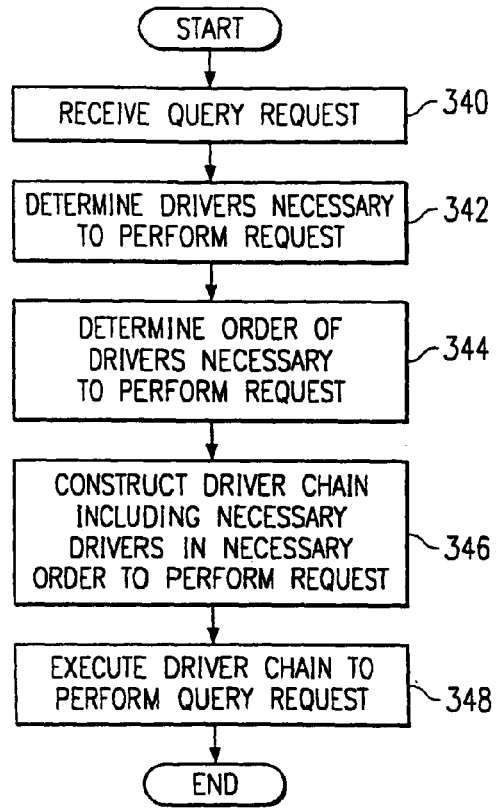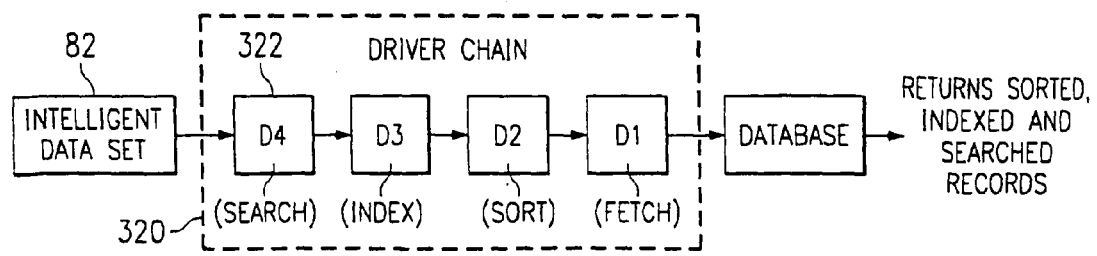

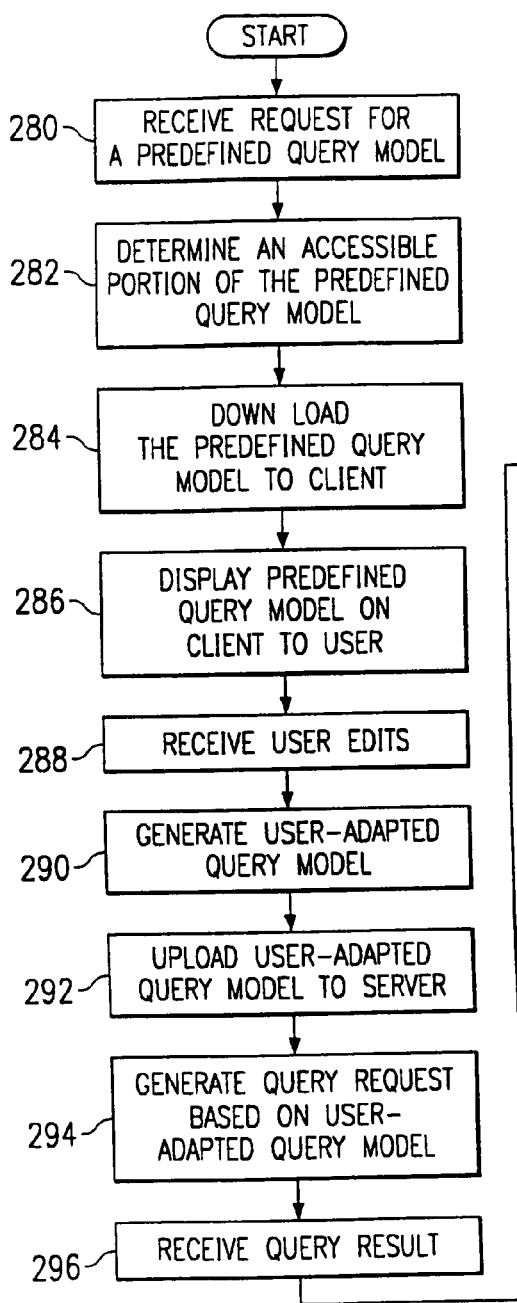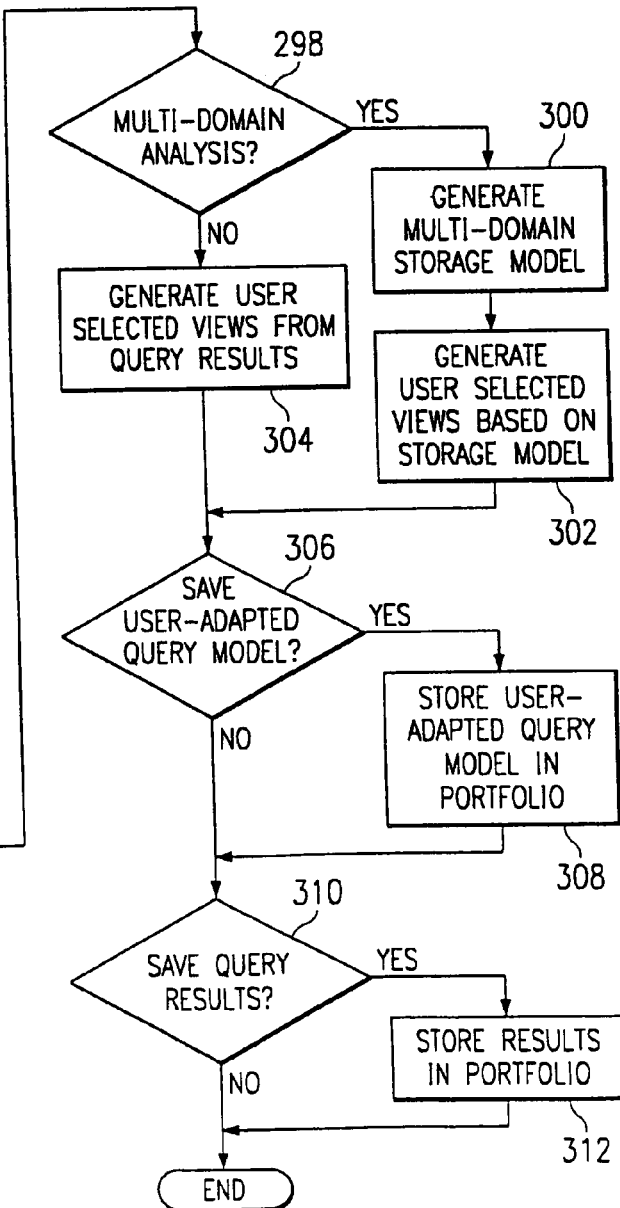
FIG. 5

METHOD AND SYSTEM FOR DISPLAYING A PLURALITY OF DISCRETE FILES IN A COMPOUND FILE

RELATED APPLICATIONS

This application is a divisional of U.S. patent application Ser. No. 09/364,595, entitled "METHOD AND SYSTEM FOR DISPLAYING A PLURALITY OF DISCRETE FILES IN A COMPOUND FILE," filed on Jul. 30, 1999, which issued as U.S. Pat. No. 7,644,366 on Jan. 5, 2010, the contents of which are hereby incorporated by reference in their entirety. In addition, this application is related to U.S. patent application Ser. No. 09/364,124, entitled "METHOD AND SYSTEM FOR MULTIDIMENSIONAL STORAGE MODEL WITH INTERDIMENSIONAL LINKS," which issued as U.S. Pat. No. 6,691,140 on Feb. 10, 2004, U.S. patent application Ser. No. 09/364,596, entitled "DYNAMIC QUERY MODEL AND METHOD," which issued as U.S. Pat. No. 6,581,054 on Jun. 17, 2003, and U.S. patent application Ser. No. 09/364,808, entitled, "MODULAR METHOD AND SYSTEM FOR PERFORMING DATABASE QUERIES," which issued as U.S. Pat. No. 6,842,758 on Jan. 11, 2005, the contents of which are hereby incorporated by reference in their entrety.

TECHNICAL FIELD OF THE INVENTION

This invention relates generally to the field of analytical data processing, and more particularly to a method and system for displaying a plurality of discrete files in a compound file.

BACKGROUND OF THE INVENTION

Business intelligence systems began largely as decision support systems (DSS) and executive information systems (EIS). Decision support systems (DSS) and executive information systems (EIS) were value added systems that provided additional information from existing on-line transactional processing (OLTP) systems.

As business intelligence systems developed, they integrated decision support system (DSS) functionality with executive information system (EIS) functionality, and added on-line analytical processing (OLAP) tools and management reporting tools. These hybrid business intelligence systems were gradually moved from a main-frame environment to a distributed server/desktop environment to allow greater user access.

More recently, the advent of centralized data warehouses and datamarts have created a dramatic increase in available data waiting to be analyzed, exploited and distributed within an organization. Such data warehouses and datamarts, however, were typically optimized for information delivery rather than transactional processing. As a result, data warehouses and datamarts offered only limited solutions for turning stored data into useful and strategic tactical information. During this same time, business intelligence systems gained prominence by offering sophisticated analysis tools for analyzing large amounts of stored information to support effective planning and decision-making within an organization.

Business intelligence systems display multidimensional and other data views in a graphical user interface. Typically, graphical user interfaces use a single data interface (SDI) to allow related data to be stored and viewed together. Single data interfaces, however, do not support contemporaneously viewing and manipulation of data in separate files. For this, graphical user interfaces employ a multiple data interface (MDI) format. During viewing of disparate files in a multiple data interface (MDI), however, windows are often maximized to provide optimal viewing. This leads to constant opening, closing, and resizing of windows by a user to view the disparate files, which limits the ability of the user to effectively compare and contrast data in the files. In addition, the multiple data interface (MDI) fails to allow related sets of data to be stored and associated with each other.

SUMMARY OF THE INVENTION

The present invention provides a method and system for displaying a plurality of discrete files in a compound file that substantially eliminate or reduce disadvantages and problems associated with previous systems and methods. In particular, the method and system provides a graphical user interface that links and displays discrete but related files together and that allows for efficient navigation between such displays in order to facilitate data analysis.

In accordance with one embodiment of the present invention, a method for managing and displaying related information in a graphical user interface includes storing each of a plurality of related datasets in a discrete file. A compound file is stored linking the discrete data files to each other. A common window for the combined file is displayed in the graphical user interface. A discrete window for each discrete file is displayed within the common window.

More specifically, in accordance with a particular embodiment of the present invention, each of the discrete files may be separately stored in the compound file. In another embodiment, the compound file may store a link to each of the discrete files. In these and other embodiments, the common window may be displayed in a single data interface (SDI) and the discrete windows may be displayed within the common window in a multiple data interface (MDI).

In accordance with another aspect of the present invention, a method for displaying discrete windows in a graphical user interface includes generating a view button for a first window in response to the first window becoming at least substantially hidden from display by overlay of a second window. The view button is displayed outside the second window along an edge of the second window or in other suitable locations. In response to activation of the view button, the first window is displayed by the graphical user interface.

Technical advantages of the present invention include providing an improved business intelligence portal that allows users to easily access and analyze data. In particular, the business intelligence portal includes a graphical user interface that allows related documents to be easily organized together and efficiently displayed to a user. In addition, elements of the user interface are highly intuitive to minimize the need for training and support.

Another technical advantage of the present invention includes providing a method and system for navigating between windows in a graphical user interface. In particular, view buttons are provided for hidden windows along an edge of an overlaying window or elsewhere to allow users to quickly and easily navigate between the windows. As a result, users need not constantly move, close, open, and resize windows to view related data stored in disparate files.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 4 is a flow diagram illustrating a method for deploying and maintaining client applications in the business intelligence portal of FIG. 1 in accordance with one embodiment of the present invention;

FIG. 5 is a flow diagram illustrating a method for generating and executing a query model based on a predefined query model in accordance with one embodiment of the present invention;

FIG. 6 is a block diagram illustrating operation of the modular query engine of FIG. 1 in accordance with one embodiment of the present invention;

FIG. 7 is a flow diagram illustrating operation of the modular query engine of FIG. 6 in accordance with one embodiment of the present invention;

DETAILED DESCRIPTION OF THE INVENTION

Figure 1:
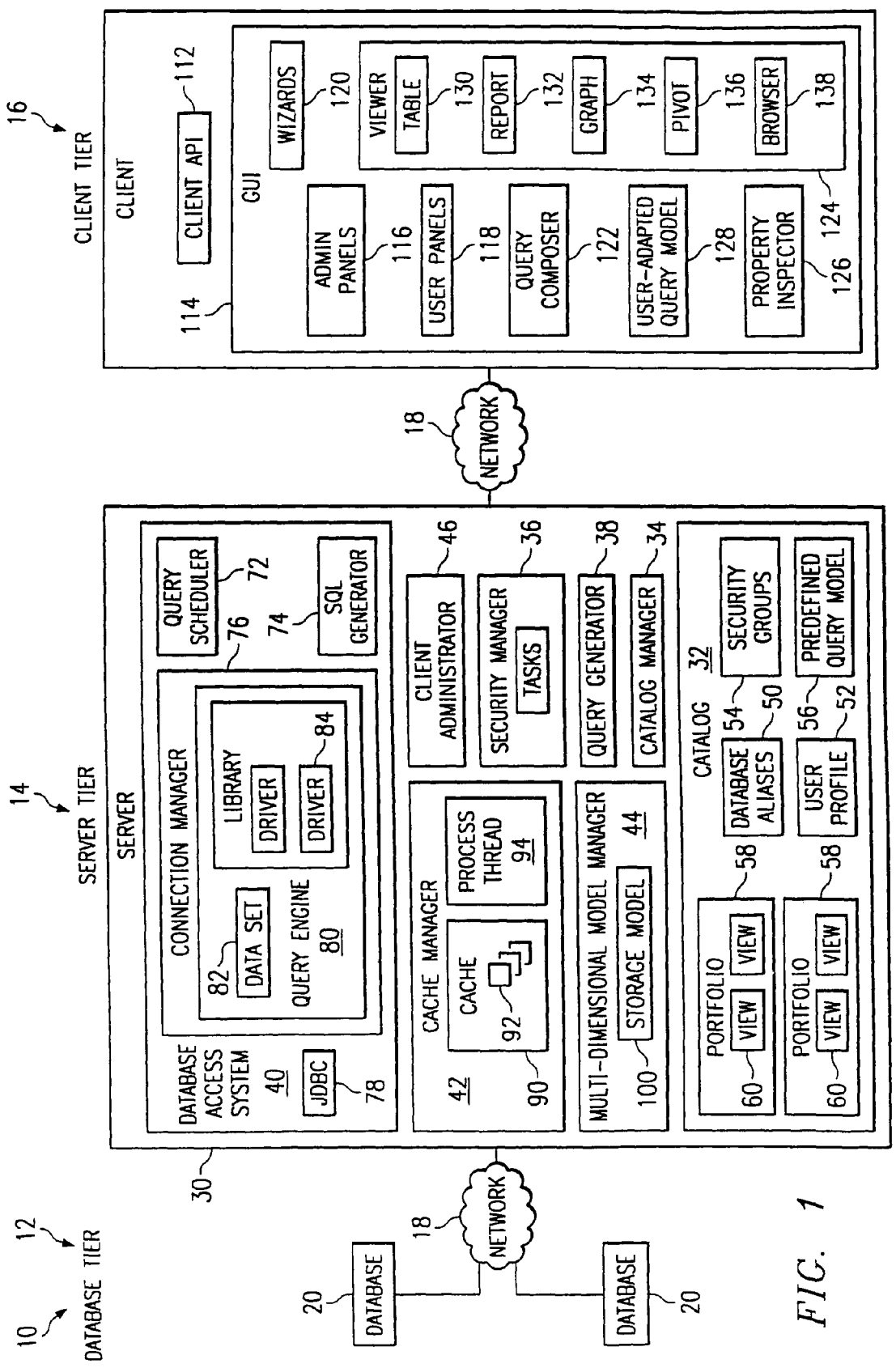
FIG. 1 is a block diagram illustrating a business intelligence portal in accordance with one embodiment of the present invention.

FIG. 1 illustrates a business intelligence portal 10 in accordance with one embodiment of the present invention. Generally described, the business intelligence portal 10 provides integrated data access and information sharing across an enterprise, as well as sophisticated multidimensional analysis tools. The analysis tools are highly automated and intuitive to allow a wide range of users to utilize stored information in making strategic decisions. In this way, the business intelligence portal 10 maximizes decision support benefits users receive from their data, while minimizing the cost of implementing and administrating the system.

In the embodiment illustrated by FIG. 1, the business intelligence portal 10 implements a three-tier distributed architecture comprising a database tier 12, a server tier 14, and a client tier 16 connected by one or more networks 18. The server and client tiers 14 and 16 are Java-based to support the Internet communication protocol (TCP/IP), multiple client and server platforms, pooled connections to a wide variety of data sources, and complete scalability of the portal 10 across an enterprise. In addition, the Java-based server and client tiers 14 and provide an open API architecture that is highly adaptable and functional for processing structured data in databases as well as unstructured data. The client/server network 18 comprises a company Intranet while the server/database network 18 includes portions of public and private networks. It will be understood that the business intelligence portal 10 may be implemented using other suitable architectures, programming languages, and links.

Referring to FIG. 1, the database tier 12 includes one or more databases 20. As described in more detail below, the databases 20 are each exposed as an alias that contains all the information necessary to connect to the database 20, including the database login. The use of database aliases prevents direct user access to the native database in order to maintain the integrity in the database 20. For the illustrative embodiment, the databases 20 may each be any Java database connection (JDBC) or object database connection (ODBC) compliant database, as well as a suitable data warehouse or datamart.

The server tier 14 includes one or more servers 30. The servers 30 each comprise a set of Java-based applications that can operate on different platforms. As described in more detail below, the servers 30 provide hierarchical security, centralized administration, fast multithreaded pooled data access, and multidimensional data analysis for the business intelligence portal 10.

The server 30 includes a catalog 32, a catalog manager 34, a security manager 36, a query generator 38, a database access system 40, a cache manager 42, a multidimensional model manager 44, and a client administrator 46. The catalog 32 stores all configurations, documents, and work products created by administrators and users of the business intelligence portal 10. This centralizes management of documents, eliminates redundant and outdated copies residing on client systems, allows documents to be shared across an enterprise, and provides continual security for the documents. The catalog manager 34 manages all shared information within the server 30. It will be understood that such configurations, documents, and work products may be otherwise suitably stored and managed within the business intelligence portal 10.

The catalog 32 includes one or more database aliases 50, user profiles 52, security groups 54, and predefined query models 56 configured by a system administrator. The catalog 32 also includes one or more portfolios 58 that store related views 60 created by a system user. As previously described, the database aliases 50 contain all information necessary to connect to the databases 20. The use of the database aliases 50 prevents direct user database access to maintain data integrity in the native databases 20 and makes it possible for non-technical users to safely access corporate data without fear of corruption. In addition, the database aliases 50 also serve to pool connections to the physical databases 20 and thereby reduce the number of database connections required to support a large number of clients.

The user profiles 52 each define a specific range of privileges for a user and one or more security groups 54 to which a user has access. The user profiles 52 are generated and maintained by a system administrator. The security groups 54 implement a hierarchical security model with security rights and privileges assigned to each group 54 by a system administrator. An administrator security group is provided to allow administrators full access to the system, including permissions to add, modify, and delete security groups 54 and user profiles 52 in the system. The final security rights and privileges that a user inherits are the union of his or her individual rights as defined in the user profiles 52 and the rights of each security group 54 to which he or she belongs. In this way, exposure of system features to users is controlled through the extensive use of permissions, or privileges, which are assigned or withheld from security groups 54 or individual user profiles 52. Thus, while administrators may have the ability to connect to databases 20 and add or delete users, power users might not have this permission. Instead, power users may have access to a full range of data analysis and collaboration features, while information consumers may only be able to run and adapt reports or charts that were previously defined by an administrator or power user.

The predefined query models 56 are self-contained logical models of particular databases that are established to make query creation by less technical users easily and intuitive. The predefined query models 56 further abstract data from a database 20, exposing only those portions of the database 20 that is relevant to the group or groups of users who will use the particular query model 56. The predefined query models 56 include relevant tables from a database, fields within the database tables, and links between the database tables that together define a query. The predefined query models 56 form the basis for all queries created by users. In this way, the predefined query model 56 controls the elements in any database 20 to which any particular set of users will have access. In addition, the predefined query models 56 establish mechanisms that may restrict the type of queries that can be made by any group of users. In particular, the mechanisms define the maximum computer resources, or governors, that can be used to execute the queries, and allowable joins between tables to prevent run-away or malicious queries that could impact the integrity of the business intelligence portal 10.

The portfolios 58 provide a file system for storing user created or obtained views 60. In addition, to internally generate views 60, the portfolios 58 may include, for example, views 60 of word processing documents, spread sheet documents, and web pages. The portfolios 58 are each a compound file capable of restoring a collection of views 60 or other related sets of data. The views 60 may be stored directly within the portfolio 58 or linked to each other in the portfolio 58.

Access to the portfolios 58 is determined by established security parameters for users and additionally by the creators of the views 60 in the portfolio 58. In one embodiment, users never see portfolios 58 to which they do not have access privileges. In addition, the portfolios 58 may be customized to provide automatic notification to associated users when views 60 within the portfolio 58 have been updated or otherwise modified. In this way, security is made integral to the operation of the system which facilitates collaboration and information sharing within an enterprise.

The views 60 provide data for displaying a wide variety of formats, such as, for example, tables, graphs, reports, pivots, and web pages. The views 60 may be either live views representing current data or snapshot views of data at a particular point in time. In addition, as described in more detail below, live views 60 may be scheduled to be updated automatically at regular intervals, updated when first opened, and the like. Snapshot views 60 may be set to overwrite prior snapshots or to create a sequence of snapshot or rollover views 60 for historical analysis. The views 60 and portfolios 58 can be saved privately by a user or may be distributed or shared among one or more security groups 54 to facilitate collaboration and decision making.

The security manager 36 manages security in the business intelligence portal 10. In particular, the security manager 36 includes predefined security tasks for generating and maintaining user profiles 52 and security groups 54. The security manager 36 also provides a security hierarchy that allows user profiles 62 and security groups 54 to inherit privileges from parent classes. In this way, a system administrator can easily establish and maintain security for the business intelligence portal 10.

The query generator 38 provides graphical views of database elements to assist system administrators and power users in defining the query models 56. The predefined query models 56 each define the database connection, the family of tables and columns exposed from the database, the allowable join types and combinations, metadata, execution governors, and aliases for the query. The predefined query models 56 can be later adapted and used by a large range of users to perform safe, secure queries.

The database access system 40 includes functionality and software for accessing and querying the databases 20 and for returning query results to the server 30 for manipulation, analysis, and reporting by users. For the illustrated embodiment, the database access system 40 includes a query scheduler 72, an SQL generator 74, a connection manager 76, and a Java database connection (JDBC) 78.

The query scheduler 72 initiates scheduled queries. As previously discussed, any view 60, including the data and calculations contained in the view 60, can be set to refresh from the database 20 according to several options, including specific time schedules. This allows views 60 to be easily refreshed to reflect the current state of the data and users to always work with the most up-to-date information. In addition, snapshot views 60 can be automatically scheduled to create an historical repository of snapshot views 60 based on the same query. Thus, for example, a view 60 may be scheduled for updates at 10:00 p.m. every Monday, Wednesday, and Friday and automatically distributed to a group of users via a shared portfolio 58.

The SQL generator 74 receives user-adapted or unadapted query models from a user and generates a textual SQL query for execution by the connection manager 76. In this way, query models which are graphically displayed and edited by users are automatically converted to executable database instructions and thereafter executed. This allows novice users and other information consumers with little or no programming knowledge to fully use and benefit from the business intelligence portal 10.

In one embodiment, the SQL generator 74 includes dialog specific generators and an SQL parse tree to generate the textual SQL. The dialog specific generators correspond to the different types of databases 20 accessed by or used in connection with the business intelligence portal 10. The dialog-specific generators may include, for example, Oracle, Sybase, DB2, and MS SQL generators.

The connection manager 76 receives textual SQL query requests from the SQL generator 74 and communicates with the databases 20 to perform the requested queries through the Java database connection (JDBC) 78. In the illustrated embodiment, the connection manager includes a modular query engine 80 including an intelligent dataset 82 and a library of data drivers 84. As described in more detail below, the data drivers 84 each execute a predefined database operation. The intelligent dataset 82 selects and orders data drivers 84 from the library as necessary to perform a query request. As a result, database access methods are standardized and the dataset need not be customized for each application.

The cache manager 42 includes a cache 90 having a plurality of pages 92 and a process thread 94. The cache manager 42 receives data extracted from the databases 20 in response to query requests and feeds them into the pages 92. The cache manager 42 runs asynchronously with the process thread 94 driving the cache 90 to feed data into the pages 92. It will be understood that data may be otherwise suitably received, stored, and initially processed by the server 30.

The multidimensional model manager 44 generates and manipulates multidimensional storage models 100. As described in more detail below, the multidimensional storage model 100 utilizes a non-sparse architecture to minimize the size of the model 100. The reduced size of the model 100 improves processing times and allows efficient pivot and drill operations during data analysis. In addition, the model 100 uses an open architecture to allow calculations to be dynamically performed after the model has been constructed. As a result, users can create new calculations to analyze data intersections that were not anticipated during the original definition of the models 100. This reduces time and resources needed to support pivot and drill operations.

The client administrator 46 provides a central point from which the portal 10 manages client administration. The client administrator 46 provides a zero-administration architecture that automatically manages deployment of client applications to maximize user performance and minimize network traffic, while assuring the latest applications are always used by the clients.

The client tier 16 includes a plurality of clients 110. The clients 110 may be local to or remote from each other and the server 30. In one embodiment, the clients 110 provide all access, including system administration, to the server 30. As previously described, all client 110 functions are controlled by a robust set of permissions stored on the server 30. Permissions are granted to both individual users and security groups of users. In this way, the robust functionality of the business intelligence portal 10 is appropriately controlled and metered out to all users across the enterprise without seeming overcomplex to less technical users.

The client 110 includes a client API 112 and a graphical user interface (GUI) 114. In the illustrated embodiment, the client 110 is designed with all components being Java pieces, or Java beans. In this embodiment, as described in more detail below, the client 110 identifies its components when establishing a connection with the server 30. This allows efficient administration of the client 110 and integration of additional functionality into the client 110.

The client API 112 comprises a set of Java classes that define how the client 110 communicates with the server 30. Because the client API 112 allows any Java program to communicate with the server 30, an enterprise may efficiently add additional, custom capabilities for its clients 110.

The graphical user interface 114 includes a set of administration panels 116, a set of user panels 118, a set of wizards 120, a query composer 122, a set of viewers 124, and a property inspector 126. The administrative and user panels 116 and 118 provide graphical displays for guiding administrators and users through their respective operations.

The wizards 120 divide creation processes into one or more logical steps and guide administrations and users through the creation process. This assists novice users and other information consumers without detailed programming knowledge in performing queries and analyzing results. In this way, all users within an enterprise are able to efficiently use the business intelligence portal 10 to extract meaningful data and thereby improve their area of operation within an enterprise.

The query composer 122 specifies where data comes from, what substantive data to display, and how it is to be stored. The query composer 122 provides a graphical view of predefined query models 56 to allow users to intuitively understand and alter the models 56 to suit their particular needs. In one embodiment, the query composer 122 allows users to only see those data elements in a model 56 to which they have privileges. The query composer 122 saves user edits of a predefined query model 56 as a user-adapted query model 128 that can be uploaded to and executed by the server 30.

The viewer 124 creates a combination of data views for tables, graphs, reports, pivots, web pages, and the like. The viewer 124 allows users to easily switch from any view 60 of data to any other and to sort and filter data. The views 60 can also be exported to HTML for publication on a web server or for sharing in the catalog 32. As previously described, data views 60 may be live or snapshots. Views or portfolios 58 of views 60 can be saved privately within an individual user's own catalog area or may be distributed and shared among one or more security groups 54 to facilitate collaboration and decision making.

Within the viewer 124, a table viewer 130 displays information as a series of columns and rows. A table view typically serves as a starting point for developing ideas because it provides an overall idea of how information is organized. In the table view, users can add filters, add calculated fields, and add summary and subtotal information. Columns can be rearranged, hidden, and otherwise modified. Content can be sorted and viewed at different levels.

A report viewer 132 displays data in a report format. A report view provides a robust, banded report format and facilitates automatic report generation and distribution. Users can freely arrange fields and columns in an interactive graphical design view of a report while adding calculations, subtotals, groupings, headers, footers, titles, and graphics.

A graph viewer 134 displays graph views of data in a wide variety of 2-D and 3-D formats. These formats may include, for example, bar, pie, line, scatter, and radar graphs. While working with a graph, users can change the graph type or contents by filtering data, using a subset of the original data, and draw multidimensional data. The graph view can also be changed on the fly, by sorting the records in a different order, as well as changing the graph properties.

A pivot viewer 136 provides pivot views displaying multidimensional, or cubed, data along multiple dimensions. This allows users to slice and dice information along disparate dimensions to gain different perspectives on the activities and performance of an enterprise. The pivot view supports hierarchies in the multiple dimensions which allows users to perform drill-down, drill-up and drill-through analysis. As described in more detail below, the multidimensional views are generated from the multidimensional storage model 100.

A browser viewer 138 provides a built-in, cross-platform web browser. This allows users to access work products and web-based Internet or Intranet environments. Reports or objects created in other views can be exported to HTML for posting to websites or display through the browser interface.

The property inspector 126 allows users to change display properties of a particular view. In one embodiment, the property inspector 126 is modeless. In this embodiment, the property inspector 126 applies the changes while on the screen to allow users to experiment with different configurations and attributes before closing the property inspector 122.

Together, the client 110 and server 30 of the business intelligence portal 10 add a strategic layer to an enterprise information structure and provides a single point of entry for integrated query, reporting, and analysis which are inherently extensible for a wide range of users. Because the business intelligence portal 10 may be fully integrated across an enterprise, the portal 10 facilitates routine enterprise-wide analysis delivery and sharing of information. As a result, far more people within an enterprise will be able to make regular and productive use of data that already exists for the enterprise.

Figure 2:
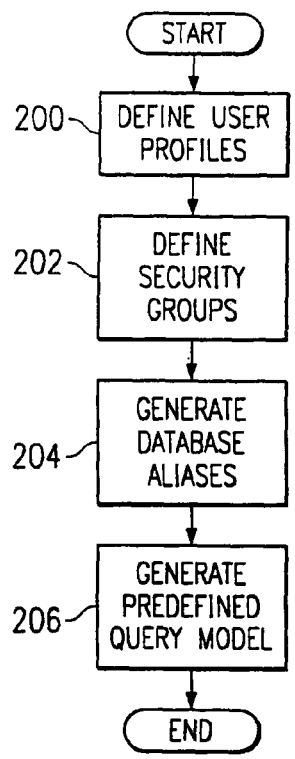
FIG. 2 is a flow diagram illustrating a method for initializing the business intelligence portal of FIG. 1 in accordance with one embodiment of the present invention.

FIG. 2 is a flow diagram illustrating a method for initializing the business intelligence portal 10 in accordance with one embodiment of the present invention. Referring to FIG. 2, the method begins at step 200 in which a system administrator defines the user profiles 52. As previously described, the user profiles 52 provide permissions for users to utilize features within the system. Next, at step 202, the system administrator defines security groups 54. As previously described, final security rights and privileges that a user inherits are the union of his or her individual rights as defined in the user profiles 52 and the rights of each security group 54 to which he or she belongs.

Proceeding to step 204, the system administrator generates a database alias 50 for each of the databases 20. The database aliases 50 prevent direct user access to the databases in order to maintain data integrity and to make it possible for non-technical users to safely access corporate data without fear of corruption. The database aliases also serve to pool connections to the physical databases 20 and thereby reduce the number of database connections required to support a large number of clients 110.

Next, at step 206, the system administrator generates the predefined query models 56 using the query generator 38. The predefined query models 56 control the elements in a database 20 to which any particular set of users will have access. In addition, the predefined query models 56 restrict the types of queries that can be executed and define the maximum computer resources that can be used to execute the queries and the allowable joins between tables to prevent run-away or malicious queries.

Step 206 leads to the end of the process by which the system administrator sets up the business intelligence portal 10 for use within an enterprise. As part of the setup process, permissions and queries for users have been defined in order to control access and distribution of data within the system.

Figure 3:
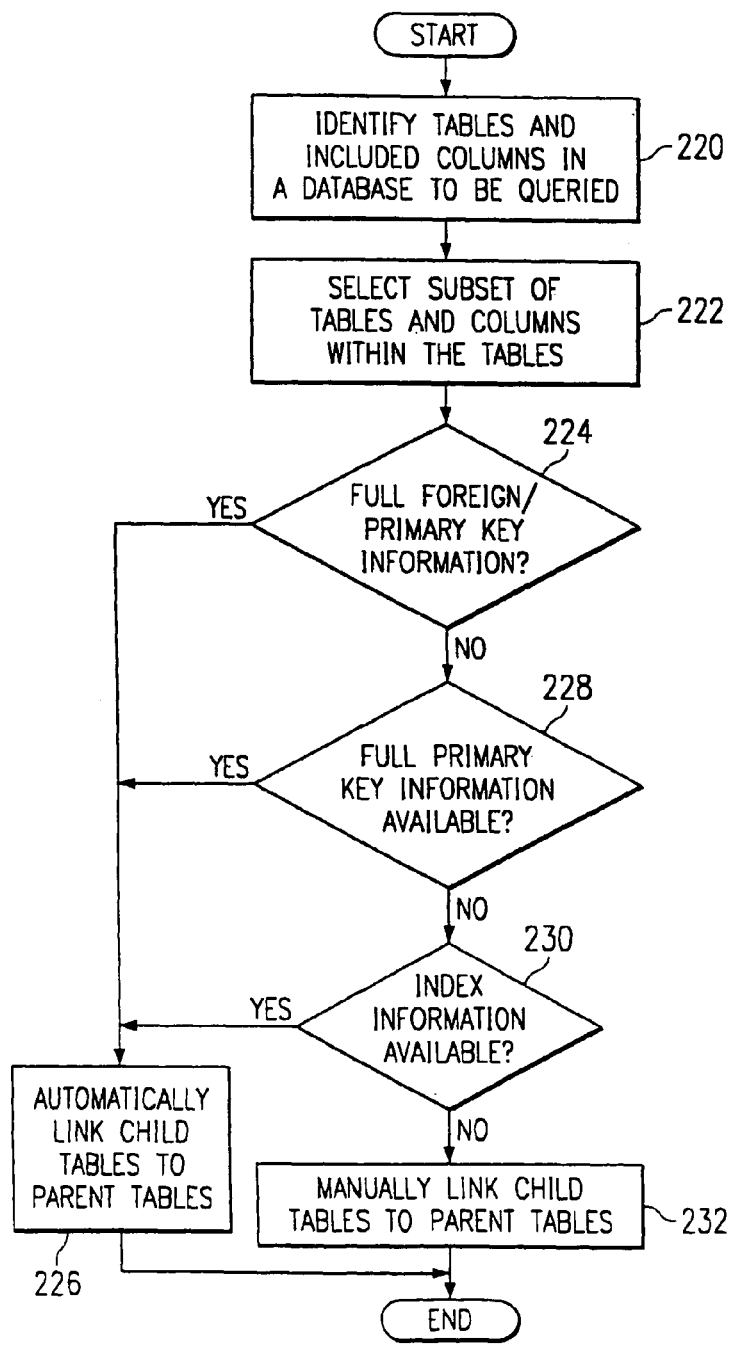
FIG. 3 is a flow diagram illustrating a method for generating predefined query models in the business intelligence portal of FIG. 1 in accordance with one embodiment of the present invention.

FIG. 3 is a flow diagram illustrating a method for generating the predefined query models 56 in accordance with one embodiment of the present invention. In this embodiment, specified data within the model is automatically linked to the extent possible. In addition, database elements are graphically displayed to the system administrator to facilitate generation of the query model 56.

Referring to FIG. 3, the method begins at step 220 in which the query generator 38 automatically identifies and displays to a system administrator the tables and columns of a database 20 for which a query is to be generated. Next, at step 222, the system administrator selects a subset of the tables and columns for a predefined query model 56.

Proceeding to decisional step 224, the query generator 38 determines whether the database 20 has full foreign key (FK)/primary key (PK) information. Full foreign key/primary key information allows data in disparate tables to be automatically linked. Accordingly, if the database 20 includes full foreign key/primary key information, the Yes branch of decisional step 224 leads to step 226 in which child tables are automatically linked to parent tables in the predefined query model 56 using the foreign key/primary key information. Step 226 leads to the end of the process. At this point, the predefined query model 56 can be saved or further edits can be made by the system administrator.

Returning to decisional step 224, if full foreign key/primary key information is not available, the No branch of decisional step 224 leads to decisional step 228. At decisional step 228, the query generator 38 determines whether full primary key information is available from the database 20. Provision of full primary key information allows parent and child tables to be determined by a database table search. Accordingly, if full primary key information is available, the Yes branch of decisional step 228 leads to step 226 where the database table search is performed to determine parent and child tables. After the parent and child tables are determined, they are automatically linked to generate the predefined query model 56. The predefined query model may then be saved or further edited by the system administrator.

Returning to decisional step 228, if full primary key information is not available, the No branch of decisional step 228 leads to decisional step 230. At decisional step 230, the query generator determines whether unique index information capable of identifying parent and child tables is available from the database 20. If such unique index information is available, the Yes branch of decisional step 230 leads to step 226. At step 226, the unique index information is used to search the database for parent and child tables. The query generator 38 then automatically links child and parent tables to generate the predefined query model 56. The predefined query model may then be saved or further edited by the system administrator.

Returning to decisional step 230, if unique index information is not available from the database 20, the No branch of decisional step 230 leads to step 232. At step 232, the system administrator manually identifies and links child and parent tables to generate the predefined query model 56. In this way, the predefined query models 56, are to the extent possible, automatically generated with minimal administrator interaction. It will be understood that database tables and other elements may be otherwise suitably linked.

FIG. 4 is a flow diagram illustrating a method for deploying and maintaining client applications in accordance with one embodiment of the present invention. In this embodiment, client applications are centrally deployed and maintained from the server 30 using a thin boot strap applet that is initially used to download Java classes forming the client applications to the client 110. After this, all upgrades to the client software are done automatically by the server 30 upon initiation of a new session by the client 110. Part of the installation/update procedure includes downloading a manifest file listing all names and versions of all modules and resources on a client 110.

Referring to FIG. 4, the method begins at step 250 in which a new connection to the server 30 is made by the client 110. At step 252, the boot strap agent on the client 110 transmits the user's manifest file to the server 30.

Proceeding to step 254, the server 30 compares the versions of all modules and resources listed in the manifest file to current versions of the corresponding files in the server 30. At decisional step 256, the server determines whether some or all of the modules or resources are outdated based on the comparison. If some or all of the modules or resources are outdated, the Yes branch of decisional step 256 leads to step 258. At step 258, the server 30 generates an incremental update for the client 110. The incremental update includes only the modules that need to be updated.

Next, at step 260, the server transmits the incremental update to the client 110. At step 262, the client 110 updates the client side applications based on the incremental update. At step 264, a new session is then launched for the update-to-date client 110. Returning to decisional step 256, if none of the client applications are outdated, the No branch of decisional step 256 also leads to step 264 in which a new session is launched. In this way, the server 30 determines what, if any, modules (or Java classes) are out-of-date, missing, or obsolete and then selectively pushes the correct modules to the user's machine along with an updated manifest. As a result, users never have to manually update client software and are able to easily roam between different work stations to log on without requiring their applications and data files to be reinstalled on each station. In addition, the client 110 executes quickly and is always up-to-date while administration is centrally maintained and network traffic is minimized.

FIG. 5 is a flow diagram illustrating a method for adapting and executing a query model based on a predefined query model 56 in accordance with one embodiment of the present invention. In this embodiment, predefined query models 56 are generated and maintained on the server 30 by an administrator and provided to users upon request and verification of access privileges.

Referring to FIG. 5, the method begins at step 280 in which the server 30 receives a request from a user for a predefined query model 56. Next, at step 282, the server determines an accessible portion of the predefined query model 56 based on the user's privileges. The accessible portion is a portion of the query model 56 that may be viewed by the user. In a particular embodiment, the accessible portion of the predefined query model 56 may also be the portion of the query model editable by the user. Determination of the accessible portion of the predefined query model 56 may be accomplished by determining the user's privileges to the query model and then determining the accessible portion based on the user's privileges.

In determining the accessible portion of the predefined query model 56, the server 30 may also determine a protected portion of the predefined query model 56. The protective portion is the remaining or other suitable portion of the predefined query model 56. As described in more detail below, the query composer 122 may conceal the protective portion of the predefined query model or otherwise prohibit edits to the protected portion of the predefined query model.

Next, at step 284, the server 30 downloads the predefined query model 56 to the client 110. At step 286, the query composer 122 displays the accessible portion of the predefined query model 56 to the user. In one embodiment, the query composer 122 displays a graphical view of accessible data elements defining the predefined query model 56. In displaying the accessible portion, the query composer 122 may conceal the protected portion of the predefined query model 56 to prevent editing and/or viewing of that portion.

Proceeding to step 288, the query composer 122 receives user edits to the predefined query model 56. User edits may include the selection or deselection of database tables, columns in the database tables, and joins between the database tables. Next, at step 290, the query composer 122 generates a user-adapted query model 128 based on user edits to the accessible portion of the predefined query model 56. At step 292, the user-adapted query model 128 is uploaded to the server 30 for execution.

At step 294, the SQL generator 74 automatically generates a database query based on the user-adapted query model 128. The database query comprises textual SQL that can be executed by the connection manager 76 to perform the query. At step 296, the server 30 receives the results of the query. As previously described, the query results are initially stored in the server 30 by the cache manager 42.

Proceeding to decisional step 298, if the query includes multidimensional analysis, the Yes branch of decisional step 298 leads to step 300 in which a multidimensional storage model 100 is generated based on the results. At step 302, the multidimensional storage model 100 is used to generate pivot, drill through, and other views as requested by the user.

Returning to decisional step 298, if multidimensional analysis is not indicated, the No branch of decisional step 298 leads to step 304 in which requested single dimensional views are generated based on the query results. Steps 302 and 304 each lead to decisional step 306. At decisional step 306, the server 30 determines whether the user-adapted query model 128 will be stored for later reuse. If the user desires to save the query model 128, the Yes branch of decisional step 306 leads to step 308 in which the query model is saved to a selected portfolio 58 of the user or a security group 58 to which the user has access. Step 308 and the No branch of decisional step 306 each lead to decisional step 310.

At decisional step 310, the server 30 determines whether the query results are to be stored as an historical snapshot. If a user selects to store the results as a snapshot, the Yes branch of decisional step 310 leads to step 312 in which the query results are stored to a selected portfolio 58. Step 312 leads to the end of the process by which a predefined query model 56 is provided to a user for adaptation and customization. The predefined query model 56 is displayed and altered using a graphical view of data elements. This facilitates robust data analysis by all users and allows novice users to effectively use available information to improve operations within their organization.

FIG. 6 is a block diagram illustrating details of the query engine 80 in accordance with one embodiment of the present invention. In this embodiment, the query engine 80 includes a library of data drivers 84 and an intelligent dataset 82 operable in response to a query request to identify from the library necessary data drivers 84 to perform the request. The intelligent dataset 82 is further operable to determine the necessary order of the data drivers 84 to perform the request, to generate a driver chain comprising the necessary data drivers 84 in the necessary order, and to execute in order the data drivers 84 in the driver chain.

Referring to FIG. 6, the intelligent dataset 82 generates a driver chain 320 in response to a query request. The driver chain 320 includes data drivers 322 necessary to perform the requested query. The data drivers 322 are dynamically selected from the library of available data drivers 84 and ordered by the intelligent dataset 82 based on the query request. In one embodiment, the data drivers 84 in the library are derived from a base class for which all interface methods call the next driver in the chain. In this embodiment, each data driver has a chain priority for placement in a same relative position within the chain 320. As used herein, the term each means every one of at least a subset of the identified items.

For the illustrated embodiment, the driver chain 320 includes data drivers D1, D2, D3, and D4. Data driver D1 performs a fetch database operation which returns requested records. The returned records are next sorted by data driver D2 and indexed by data driver D3. Data driver D4 then performs the requested search on the sorted and indexed data records. In this way, the modular query engine 80 employs standardized access methods to perform database queries. As a result, the portal 10 need not be customized for particular database queries and the cost to provide and maintain the business intelligence portal 10 is reduced.

FIG. 7 is a flow diagram illustrating operation of the modular query engine 80 in accordance with one embodiment of the present invention. Referring to FIG. 7, the method begins at step 340 in which a query request is received by the intelligent dataset 82. Next, at step 342, the intelligent dataset 82 dynamically selects data drivers 84 from the library necessary to perform the query request.

Proceeding to step 344, the intelligent dataset 82 determines the order of data drivers 84 necessary to perform the request. At step 346, the intelligent dataset dynamically constructs a driver chain comprising the necessary data drivers in the necessary order to perform the query request.

Next, at step 348, the intelligent dataset executes the driver chain to perform the query request. Within the driver chain, the datasets 82 are executed in order with each calling a next driver 84 in the chain upon completion of its own execution. As a result, the query engine 80 and dataset 82 are application independent and can be easily modified to support new functionality by adding data drivers 84 to the library and programming the intelligent dataset 82 as to their functionality.

Figure 8:
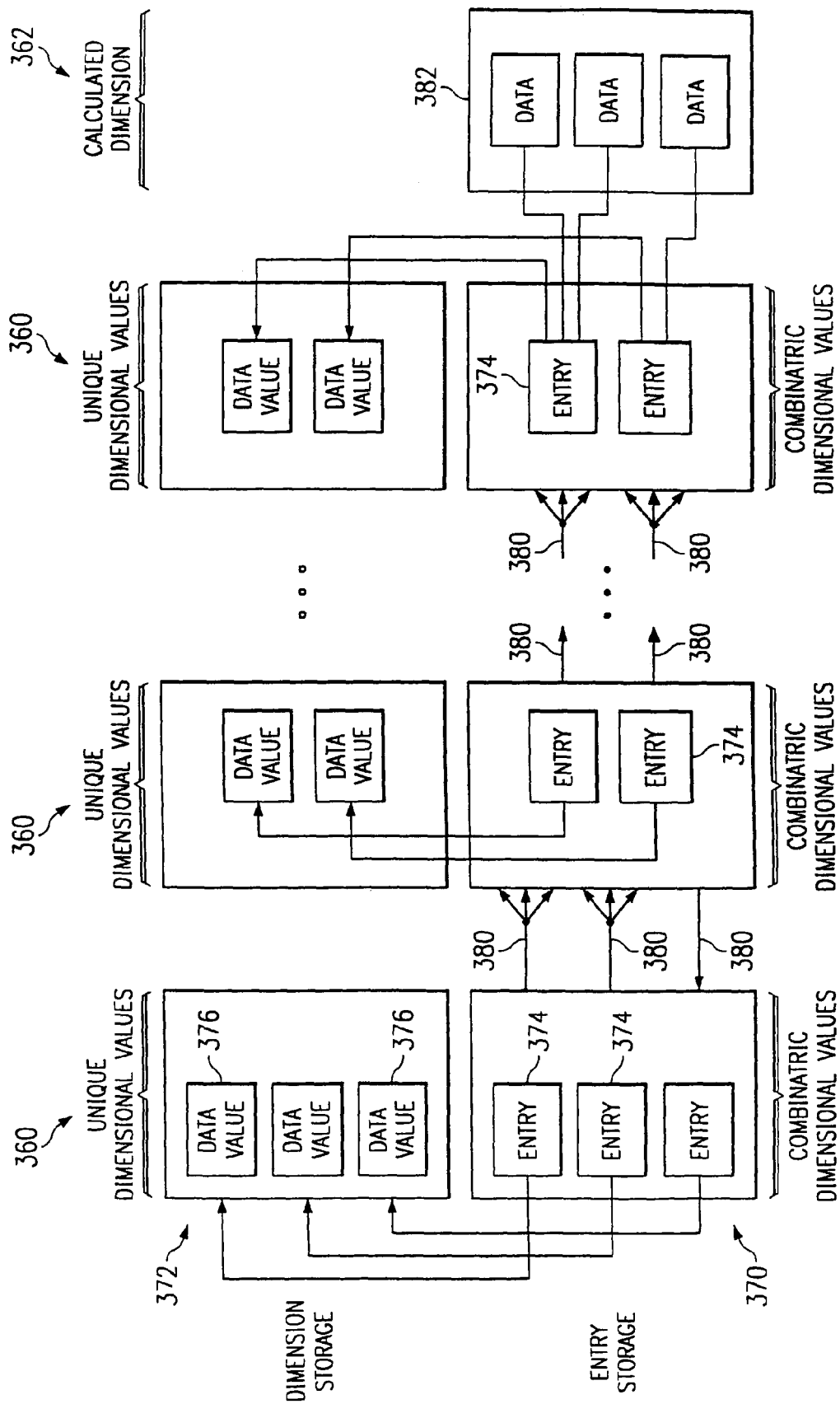
FIG. 8 is a block diagram illustrating a multidimensional storage model in accordance with one embodiment of the present invention.

FIG. 8 is a block diagram illustrating details of a multidimensional storage model 100 in accordance with one embodiment of the present invention. In this embodiment, the storage model 100 utilizes a non-sparse architecture to minimize the size of the model 100. In addition, the storage model 100 uses an open architecture to allow calculations to be dynamically performed after the model 100 is constructed.

Referring to FIG. 8, the multidimensional storage model 100 comprises a slot 360 for each dimension and a slot 362 for a calculated dimension. The dimensional slots 360 contain entries and associated data values extracted from a database while the calculated dimension slots 362 contain data calculated based on the extracted data.

For the illustrated embodiment, each dimension slot 360 includes an entry storage 370 and a dimension storage 372. The entry storage 370 contains a set of non-sparse entries 374 for the corresponding dimension. Preferably, only non-sparse entries are included. The entries 374 represent combinatric dimensional values and each identify an associated data value 376. In one embodiment, each entry 374 includes a pointer to the associated data value 376. Alternatively, the data values 376 can be stored along with the entries 374 in the entry storage 370. Use of the pointers and separate storage of the data value 376, however, improves efficiency and processing speed of the multidimensional storage model 100.

The dimension storage 372 includes the data values 376 associated with entries 374 in the entry storage 370. The data values 376 represent unique dimensional values for each dimension.

A set of interdimensional links 380 is provided for each non-sparse entry 374. Each interdimensional link identifies an intersection between non-sparse entries 374 in different dimensional slots 360. The set of interdimensional links 380 includes one or more interdimensional links. In one embodiment, the interdimensional links 380 are bi-directional to allow efficient traversal between the dimensional slots 360 in either direction from an entry point.

The interdimensional links 380 collectively identify all intersections between non-sparse entries 374 in the dimensional slots 360. Accordingly, all intersections, including non stored empty intersections, can be determined from the non-sparse entries 374 and traversal of the interdimensional links 380. In particular, a null intersection between database entries in a first and a second dimension is determined by the lack of the database entries in the model or the lack of interdimensional links 380 connecting the entry 374 in the first dimension to the entry in the second dimension. Non-sparse intersections between entries 374 in a first and second dimension are determined by traversing the interdimensional links 380 from the specified entry in the first dimension to the specified entry in the second dimension and then obtaining the data value 376 associated with the entry 374 in the second dimension. Data and information obtained by traversal of the interdimensional storage model 100 is output for further processing as described in more detail below.

The calculated dimension 362 includes a set of calculated values 382. The calculated values 382 are values derived from predefined calculations requested by a user contemporaneously with the multidimensional storage model 100. Thus, while the multidimensional storage model 100 provides an open architecture to allow calculations after its creation, contemporaneous calculations requested by the user with the model are precalculated and stored to minimize processing after creation of the model 100 and to improve the speed of multidimensional analysis.

Figure 9:
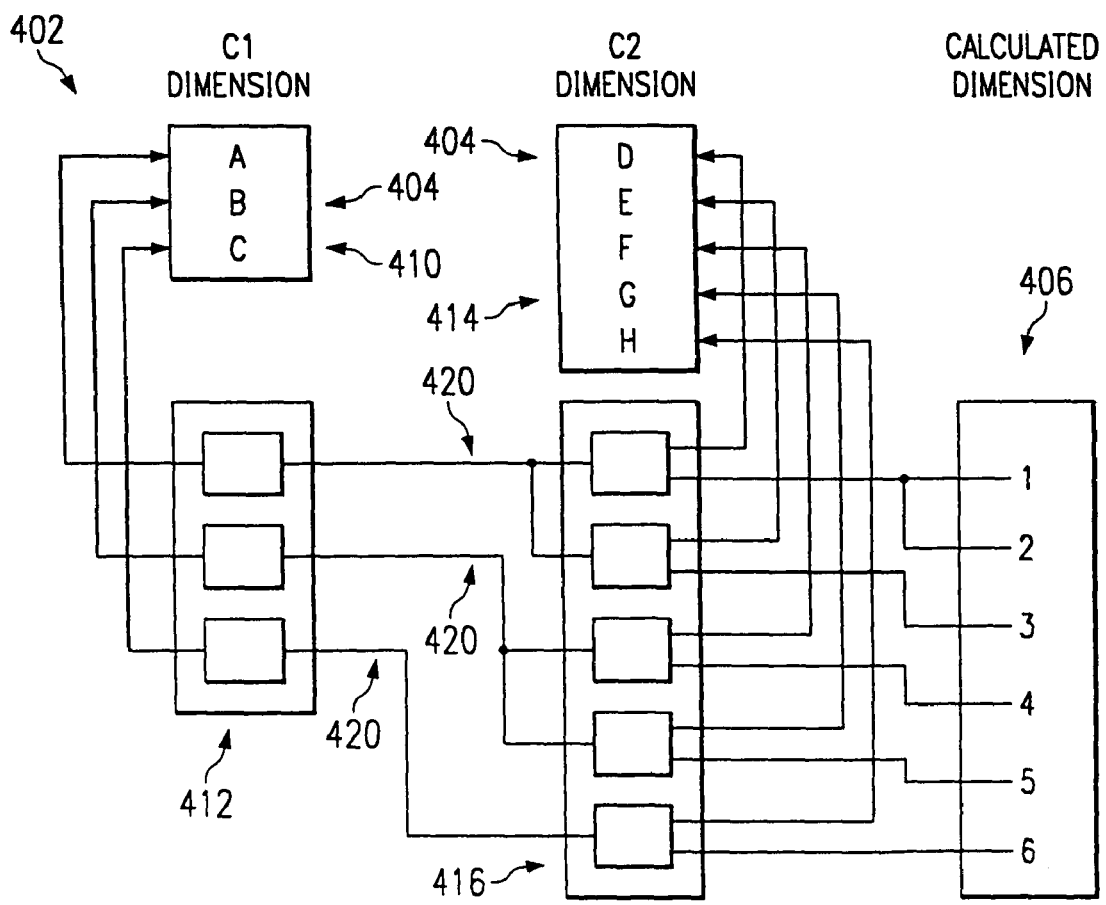
FIG. 9 is a block diagram illustrating exemplary data for the multidimensional storage model of FIG. 8.

FIG. 9 is a block diagram illustrating exemplary data 400 and an exemplary multidimensional storage model 402 for the exemplary data 400. Referring to FIG. 9, the exemplary data 400 includes dimensions C1 and C2 and calculated dimension C3. Dimension C1 includes unique entry values A, B, and C while dimension C2 includes unique entry values D, E, F, G, and H. The calculated dimension C3 includes calculated data values 1, 2, 3, 4, 5, and 6 corresponding to different predefined calculations.

The exemplary storage model 402 includes dimensional slots 404 for dimensions C1 and C2 and calculated dimensional slot 406 for calculated dimension C3. In the C1 dimensional slot 404, the dimensional storage 410 includes unique dimensional values A, B, and C. The entry storage 412 includes entries with which the data values are associated and pointers to the data values. Similarly, the C2 dimensional slot 404 includes unique data values D, E, F, G, and H in dimensional storage 414. Entry storage 416 includes entries associated with the data values and pointers to the data values. Interdimensional links 420 identify intersections between entries, and thus data, in the C1 and C2 dimensions. The calculated dimension 406 includes calculated data values 1, 2, 3, 4, 5, and 6 associated with predefined intersections of data in the C1 and C2 dimensions.

From the exemplary storage model 402, it can be determined, for example, that entry values A and D in the C1 and C2 dimensions intersect in that they are connected by interdimensional links 420. It can be further determined that entry values C and D do no intersect in that they are not connected by interdimensional links 420. Entries are connected by interdimensional links if any one or a series of interdimensional links connect the entries.

Figure 10:
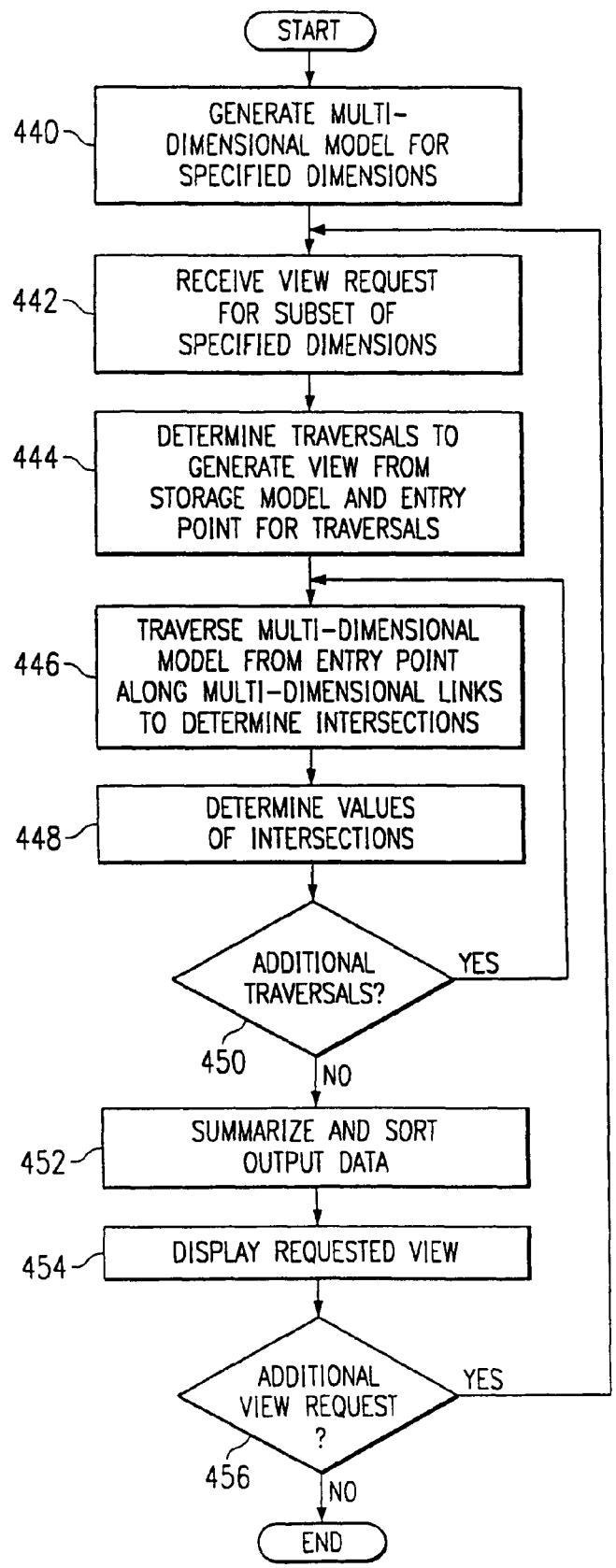
FIG. 10 is a flow diagram illustrating a method for generating the multidimensional storage model of FIG. 8 in accordance with one embodiment of the present invention.

FIG. 10 is a flow diagram illustrating a method for generating and using the multidimensional storage model 100 in accordance with one embodiment of the present invention. Referring to FIG. 10, the method begins at step 440 in which the multidimensional storage model 100 is generated by the multidimensional model manager 44 in response to a query request and is based on results of the query request. The query request specifies the dimensions and data dimensions for the multidimensional storage model 100.

In one embodiment, the multidimensional model manager generates the multidimensional storage model 100 by first fetching data records from the source. For each data record, the dimensional values and data values are then fetched. Thereafter, for each dimensional value of a data record the multidimensional model manager 44 determines if the dimensional value is present in entry storage 370, in which case it may be used. If the dimensional value is not present in the entry storage 370, an entry 374 is created for the dimensional value in entry storage 370 and the corresponding data value 376 stored in dimension storage 372. In either case, the dimensions are next traversed from left to right to create interdimensional links 380 for the entries 374 in entry storage 370. Existing links are reused while links that are missing are created. In addition, for the right-most dimension, data values fetched for the record are added by the multidimensional model manager 44. It will be understood that the multidimensional storage model 100 may be otherwise suitably generated.

After the multidimensional storage model 100 is generated, step 440 proceeds to step 442. At step 442, the multidimensional model manager 44 receives a view request for a subset of the specified dimensions and/or data dimensions. Next, at step 444, the multidimensional model manager 44 determines traversals necessary to generate the view from the storage model 100 and a starting point for each traversal. The traversals are defined by the specified dimensions and the starting point on entry determined based on how the model 100 is organized.

In one embodiment, the multidimensional model manager retrieves a first and a next record from the multidimensional storage model 100 using a bottom-up, right-to-left recursive movement. In this embodiment, to retrieve the first record, the multidimensional model manager 44 positions a first dimension selected for display to the first entry storage value. Next, all parent entries, which are those to the left of the first entry, are positioned to their first entry storage value. Child entries, which are those to the right of the selected dimension, are also positioned to their first entry storage value. For the first record, the multidimensional model manager 44 then retrieves values for dimensional entries at these positions. To retrieve the next record, the multidimensional manager 44 attempts to move the right-most child in the view. If the right-most child is movable, it is repositioned and the data values fetched at the current positions within the multidimensional storage model 100. If the right-most child is not movable, the multidimensional model manager 44 attempts to move the parent of that child, which is the entry immediately to the left of the child. If the parent is movable, it is repositioned and the data values fetched at their current positions in the multidimensional storage model 100. If the parent cannot be moved, an attempt is made to move the parent of that parent, which is the entry immediately to the left of the first parent, and the process repeated until no parents remain. At this point, the end of the process is reached. It will be understood that the traversals and starting points within the multidimensional storage model 100 may be otherwise suitably determined.

Proceeding to step 446, the multidimensional model manager 44 traverses the multidimensional storage model 100 from the entry point across connecting multidimensional links 380 to determine the existence and/or value at a specified intersection. At step 448, the multidimensional storage model 100 determines any value at the specified intersection. Next, at step 448, the multidimensional model manager 44 determines whether additional traversals exist for the model 100. If additional traversals exist, the Yes branch of decisional step 450 returns to step 446 and the remaining traversals are performed and intersectional values calculated until all traversals have been completed. The No branch of decisional step 450 then leads to step 452.

At step 452, data and information output from the multidimensional storage model 100 is summarized and sorted. It will be understood that the multidimensional storage model 100 may be otherwise configured to presort and summarize data. However, by separating the traversal operation from the summarizing and sorting operations, processing efficiency is improved.

Next, at step 454, information output from the multidimensional storage model 100 is graphically displayed to the user in a requested view by the viewers 124 on the client 110. Proceeding to decisional step 456, if additional views are requested, the Yes branch returns to step 442 in which the view request and specified dimensions are received and the process repeated until all requested views have been completed and displayed to the user. At this point, the No branch of decisional step 456 leads to the end of the process. In this way, the business intelligence portal 10 provides a multidimensional storage model 100 of reduced size and improved processing speeds that support efficient pivot and drill operations during data analysis. In addition, a user can create new calculations to analyze data intersections that were not anticipated during the original definition of the model. This reduces time and resources needed to support pivot and drill operations. The additional views may include pivot views and data drilling for high and low level analysis.

Figure 11:
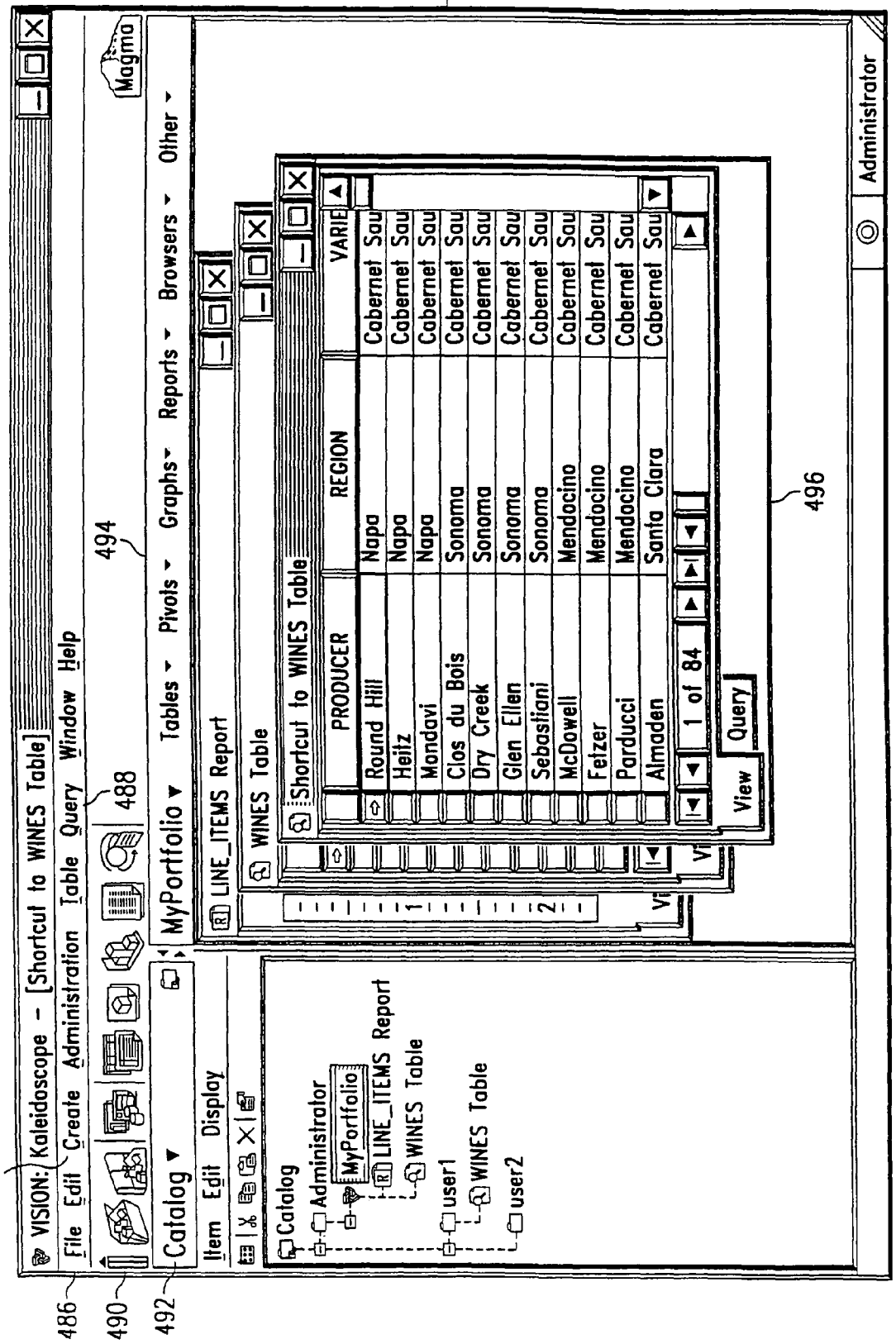
FIG. 11 is a screen diagram illustrating a display of related views in the portfolio of FIG. 1 in accordance with one embodiment of the present invention.

FIG. 11 is a screen diagram illustrating a display of related window 480 in accordance with one embodiment of the present invention. Referring to FIG. 11, the display window 480 includes a menu bar 486 with a variety of pull down menus 488 disposed along a top edge of the display window 480. A tool bar 490 is disposed immediately below the menu bar 486.

The display window 480 further includes a catalog window 492 and a portfolio window 494 adjacent the catalog window 492. The catalog window 492 displays a file hierarchy within the catalog 32. The portfolio window 494 displays the views linked by the action portfolio.

Within the portfolio window 494, each of the views is separately displayed in a discrete view window 496. Storage of the views in discrete files linked by the portfolio and display of the related views within the portfolio window 494 allows related documents to be easily organized together and efficiently displayed to a user. In particular, the portfolio window 494 provides a common window with a single data interface (SDI). The discrete view windows 496 are displayed within the common window in a multiple data interface (MDI). It will be understood that other types of related components may be discretely stored and linked together for display through a compound file.

Figure 12:
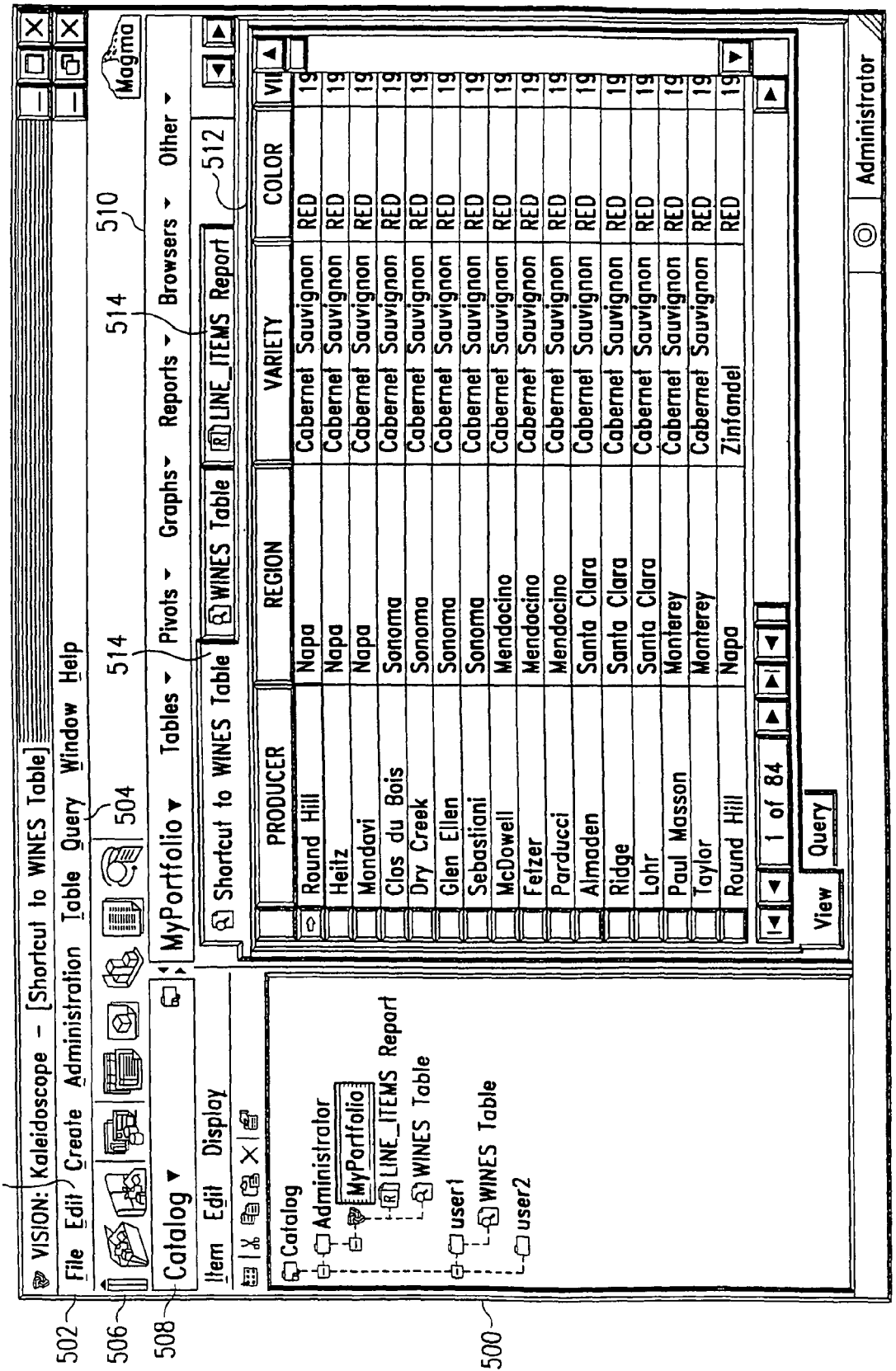
FIG. 12 is a screen diagram illustrating window tabs for navigating between related views in accordance with one embodiment of the present invention.

FIG. 12 is a screen diagram illustrating a display window 500 including view buttons for navigating between related views in a portfolio in accordance with one embodiment of the present invention. Referring to FIG. 12, the display window 500 includes a menu bar 502 with a variety of pull down menus 504 disposed along a top edge of the display window 500. A tool bar 506 is disposed immediately below the menu bar 502. The display window 500 includes a catalog window 508 and a portfolio window 510 as previously described in connection with catalog window 492 and portfolio window 494.

In the illustrated embodiment, view windows 512 are maximized with the portfolio window 510 to provide optimized viewing. To allow navigation between the maximized windows, view buttons 514 are provided in response to maximization of a window 512 and displayed as tabs along a top edge of the portfolio window 510. The view buttons 514 are each operable to display an associated window 512 as the active window in response to activation. This allows users to quickly and easily navigate between the windows. As a result, users need to constantly move, close, open, and resize windows to view related data stored in disparate files. The view buttons may be otherwise displayed or generated in response to other suitable events. For example, the view buttons may be generated any time a first window becomes at least substantially hidden from display by an overlying window. Thus, as soon as a user indicates that a window should be maximized, positioned, or displayed to cover a window, a view button 514 may be generated for the window to be covered. The view buttons 514 may be positioned independently of a corresponding window. Thus, they may be displayed adjacent to or remote from a corresponding window.

Although the present invention has been described with several embodiments, various changes and modifications may be suggested to one skilled in the art. It is intended that the present invention encompass such changes and modifications as fall within the scope of the appended claims.

What is claimed is:

1. A method for displaying discrete windows in a graphical user interface, comprising:
   generating a plurality of views associated with a predefined query model that logically models exposed data in a database, wherein a plurality of discrete files separately store the plurality of views associated with the predefined query model;
   storing the plurality of discrete files that separately store the plurality of views in a compound file that links the plurality of separately stored views to one another;
   displaying the plurality of views associated with the predefined query model in a graphical user interface, wherein the graphical user interface includes a plurality of discrete windows that separately display the plurality of separately stored views linked to one another in the compound file;
   displaying a catalog window in the graphical user interface adjacently to a portfolio window that displays the plurality of discrete windows in the graphical user interface, wherein the catalog window displays a file hierarchy corresponding to a file system that links the plurality of separately stored views to one another;
   generating a view button associated with a first one of the plurality of discrete windows, wherein the graphical user interface displays the view button in response to a second one of the plurality of discrete windows substantially overlaying the first discrete window in the graphical user interface; and
   activating the first discrete window in response to an input that activates the view button, wherein activating the first discrete window causes the first discrete window to substantially overlay the second discrete window in the graphical user interface.

2. The method of claim 1, wherein the graphical user interface displays the view button outside the second discrete window.

3. The method of claim 2, wherein the graphical user interface further displays the view button along a top edge associated with the portfolio window that displays the plurality of discrete windows in the graphical user interface.

4. The method of claim 3, wherein the compound file includes the file system that links the plurality of separately stored views to one another.

5. The method of claim 1, wherein activating the first discrete window includes:
   displaying a second view button associated with the second discrete window in the graphical user interface in response to the first discrete window substantially overlaying the second discrete window in the graphical user interface; and
   activating the second discrete window in response to a second input that activates the second view button, wherein activating the second discrete window causes the second discrete window to substantially overlay the first discrete window in the graphical user interface.

6. A method for navigating between discrete windows displayed in a graphical user interface, comprising:
   generating a plurality of views associated with a predefined query model that logically models exposed data in a database, wherein a plurality of discrete files separately store the plurality of views associated with the predefined query model;
   storing the plurality of discrete files that separately store the plurality of views in a compound file that links the plurality of separately stored views to one another;
   displaying the plurality of views associated with the predefined query model in a graphical user interface, wherein the graphical user interface includes a plurality of discrete windows that separately display the plurality of separately stored views linked to one another in the compound file;
   displaying a catalog window in the graphical user interface adjacently to a portfolio window that displays the plurality of discrete windows in the graphical user interface, wherein the catalog window displays a file hierarchy corresponding to a file system that links the plurality of separately stored views to one another;
   generating one or more view buttons associated with one or more of the plurality of discrete windows that are maximized in the graphical user interface, wherein the graphical user interface displays the one or more view buttons in response to an active one of the plurality of discrete windows substantially overlaying the one or more maximized discrete windows in the graphical user interface; and
   receiving an input that activates one of the one or more view buttons, wherein the input causes the graphical user interface to activate one of the one or more substantially overlaid discrete windows associated with the activated view button.

7. The method of claim 6, wherein the one or more view buttons include clickable tabs displayed in the graphical user interface along a top edge associated with the portfolio window that displays the plurality of discrete windows in the graphical user interface.

8. A system for displaying discrete windows in a graphical user interface, wherein the system comprises one or more processors configured to:
   generate a plurality of views associated with a predefined query model that logically models exposed data in a database, wherein a plurality of discrete files separately store the plurality of views associated with the predefined query model;
   store the plurality of discrete files that separately store the plurality of views in a compound file that links the plurality of separately stored views to one another;
   display the plurality of views associated with the predefined query model in a graphical user interface, wherein the graphical user interface includes a plurality of discrete windows that separately display the plurality of separately stored views linked to one another in the compound file;
   display a catalog window in the graphical user interface adjacently to a portfolio window that displays the plurality of discrete windows in the graphical user interface, wherein the catalog window displays a file hierarchy corresponding to a file system that links the plurality of separately stored views to one another;
   generate a view button associated with a first one of the plurality of discrete windows, wherein the one or more processors cause the graphical user interface to display the view button in response to a second one of the plurality of discrete windows substantially overlaying the first discrete window in the graphical user interface; and
   activate the first discrete window in response to an input that activates the view button, wherein the activated first discrete window substantially overlays the second discrete window in the graphical user interface.

9. The system of claim 8, wherein the one or more processors further cause the graphical user interface to display the view button outside the second active window.

10. The system of claim 9, wherein the one or more processors further cause the graphical user interface to display the view button along a top edge associated with the portfolio window that displays the plurality of discrete windows in the graphical user interface.

11. The system of claim 10, wherein the compound file includes the file system that links the plurality of separately stored views to one another.

12. The system of claim 8, wherein the one or more processors are further configured to:
  display a second view button associated with the second discrete window in the graphical user interface in response to the first discrete window substantially overlaying the second discrete window in the graphical user interface; and
  activate the second discrete window in response to a second input that activates the second view button, wherein the activated second discrete window substantially overlays the first discrete window in the graphical user interface.

* * * * *